April 20, 1937.     E. E. HEWITT     2,077,930
FLUID PRESSURE BRAKE
Filed Sept. 12, 1936
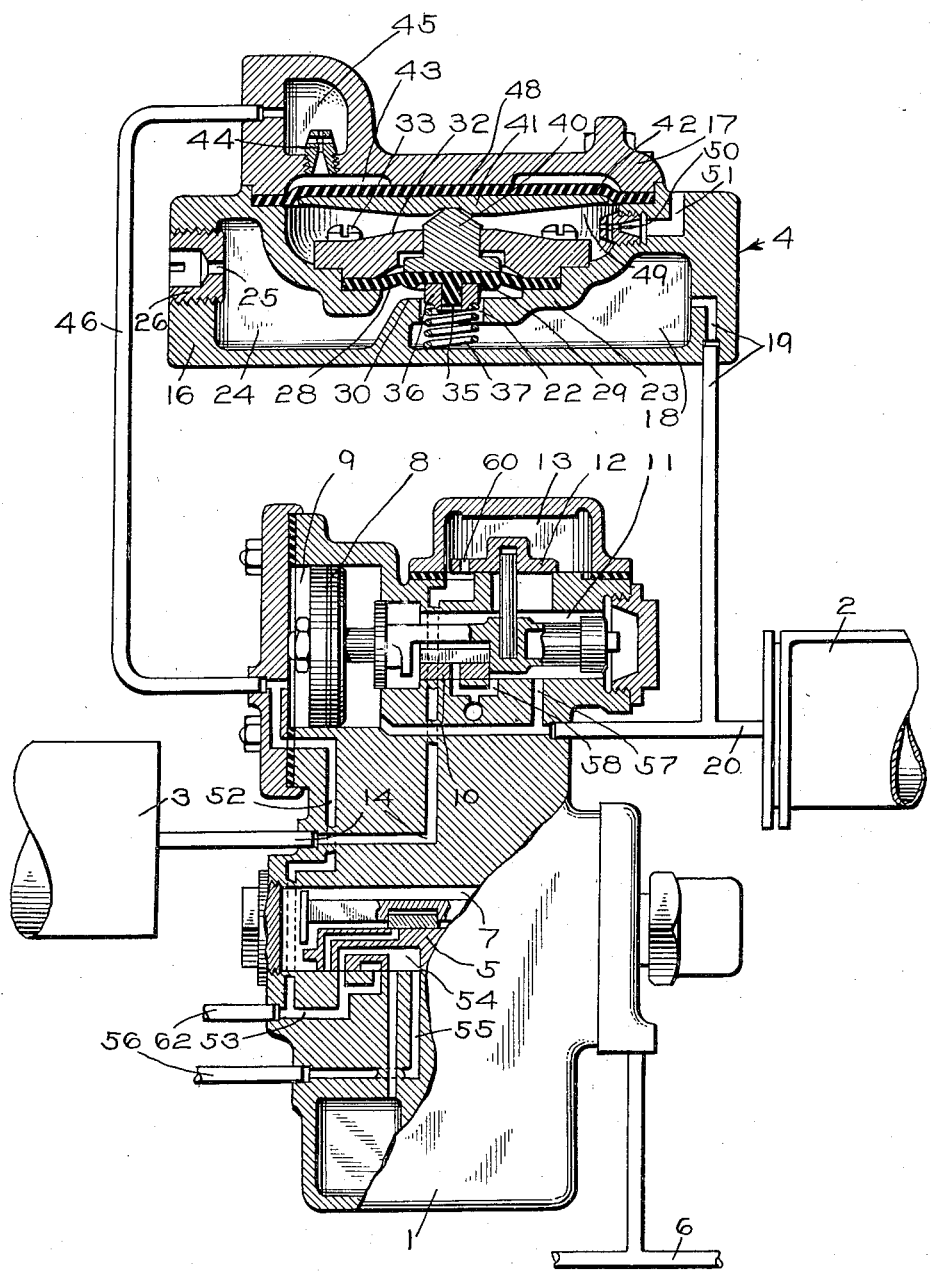
INVENTOR
ELLIS E. HEWITT
BY *Wm. M. Cady*
ATTORNEY Patented Apr. 20, 1937

2,077,930

UNITED STATES PATENT OFFICE 2,077,930

FLUID PRESSURE BRAKE

Ellis E. Hewitt, Edgewood, Pa., assignor to The Westinghouse Air Brake Company, Wilmerding, Pa., a corporation of Pennsylvania Application September 12, 1936, Serial No. 100,490

4 Claims. (Cl. 303—69)

This invention relates to fluid pressure brakes, and more particularly to a locomotive fluid pressure brake equipment.

The well known distributing valve provided in the ET locomotive brake equipment comprises an equalizing portion and an application portion, which includes valve means adapted to be operated by the pressure of fluid in an application cylinder to effect the supply of fluid under pressure to the locomotive brake cylinders, and upon a reduction in fluid pressure in the application cylinder to release fluid under pressure from the brake cylinders. If the frictional resistance to movement of the valve means in the distributing valve application portion should become too great, due to accumulation of dirt in the application piston cylinder or other cause, the proper operation of the valves means to vent fluid under pressure from the locomotive brake cylinders in effecting a release of the brakes might be undesirably delayed or even prevented.

The principal object of my invention is to provide means adapted to be associated with a distributing valve device in the above type of fluid pressure brake equipment for ensuring the prompt release of the brakes.

In the accompanying drawing, the single figure is a diagrammatic, sectional view of a fluid pressure brake equipment embodying my invention.

As shown in the drawing, the equipment may comprise a distributing valve device 1, a brake cylinder 2, a main reservoir 3, and a release valve device 4.

The distributing valve device 1 comprises an equalizing portion which includes a slide valve 5 mounted in a valve chamber 7 and adapted to be operated in the usual manner by a piston (not shown) according to variations in the pressure of fluid in a brake pipe 6, and an application portion, which comprises a piston 8 subject to the pressure of fluid in an application cylinder 9, an exhaust slide valve 10 contained in a valve chamber 11, and an application slide valve 12 contained in a chamber 13, said slide valves 10 and 12 being adapted to be operated by the piston 8. The valve chamber 13 communicates by way of a passage and pipe 14 with the main reservoir 3.

According to the invention, the release valve device 4 comprises casing sections 16 and 17 secured together by any suitable means, such as bolts (not shown). Formed in the casing section 16 is a chamber 18 connected through a passage and pipe 19 and a pipe 20 with the brake cylinder 2, and communicating by way of an aperture 22 formed in a web 23 with a chamber 24, which is open to atmosphere through a restricted passage 25 in a choke plug 26. For controlling communication between the chambers 18 and 24 there is provided a flexible diaphragm 28 which has an annular seat rib 29 aligned for seating engagement with a seating face 30 surrounding the aperture 22 of the web 23. The diaphragm 28 is mounted between the web 23 and a plate 32 secured to the web by any suitable means such as screws 33, and has a central stud 35 formed on the lower side thereof on which is fitted an annular member 36 which is subject to the force of a coil spring 37 arranged to bias the rib 29 of the diaphragm away from the seating face 30.

Engaging the upper side of the diaphragm 28 is a follower member 40, the upper end of which extends through a central opening in the plate 32 and is engaged by a follower plate 41 that is in engagement with the under side of a flexible diaphragm 42 mounted between the casing sections 16 and 17. The diaphragm 42 has a larger pressure area than the diaphragm 28, and together with the casing section 17 defines a chamber 43 connected through a restricted passage 44 in a choke plug with a chamber 45 in said casing section, which communicates by way of a pipe 46 with the application cylinder 9 in the distributing valve device 1.

Upward movement of the diaphragm 42 is limited by a stop portion 48 formed on the casing section 17. A chamber 49 is formed between the diaphragms 42 and 28 and is always open to the atmosphere by way of a restricted passage 50 in a choke plug and a passage 51 provided in the casing section 16.

The operation of the distributing valve device 1 is well known in the art and need not be described in detail. With the parts of the distributing valve device in the release position as shown in the drawing and assuming that the well known automatic and independent brake valves are in running position, the application cylinder 9 and the chamber 43 of the release valve device connected thereto are vented by way of passages 52 and 53, a cavity 54 in the equalizing slide valve 5, a passage 55 and the usual release pipe 56, which is connected through said brake valve devices in running position with the atmosphere. At the same time, the brake cylinder 2 is connected with the atmosphere by way of the pipe 20, passage 57 in the distributing valve device 1, the chamber 11 and exhaust port 58, and also by way of the pipe 19, chamber 18 of the release valve device 4, aperture 22, cham-

a valve operative to control the release of fluid under pressure from the brake cylinder, a spring, and movable abutment means subject on one side to the pressure of fluid in said application chamber and on the opposite side to the pressure of said spring and brake cylinder pressure for operating said valve.

3. In a fluid pressure brake, in combination, a brake cylinder, a distributing valve device comprising valve means operable according to variations in fluid pressure in an application chamber for controlling the supply and release of fluid under pressure to and from the brake cylinder, and an auxiliary release valve device comprising a valve operative to effect the release of fluid from the brake cylinder, and a pair of movable abutments for controlling the operation of said valve, one of said abutments having a larger area than the other and being subject to the pressure of fluid in the application chamber and the other abutment being subject to the pressure of fluid in the brake cylinder.

4. In a fluid pressure brake, in combination, a brake cylinder, a distributing valve device comprising valve means operable according to variations in fluid pressure in an application chamber for controlling the supply and release of fluid under pressure to and from the brake cylinder, and an auxiliary release valve device comprising valve means for controlling the release of fluid from the brake cylinder and movable abutment means subject on one side to the pressure in a chamber which is connected to the application chamber through a restricted port and on the opposite side to brake cylinder pressure.

ELLIS E. HEWITT.